United States Patent [19]

Prang

[11] Patent Number: 4,698,278

[45] Date of Patent: Oct. 6, 1987

[54] THREE-LAYER LAMINATED PANEL AND METHOD FOR PRODUCTION

[75] Inventor: Jorgen S. Prang, Langeskov, Denmark

[73] Assignee: Alliance Pentagon A/S, Odense, Denmark

[21] Appl. No.: 921,723

[22] Filed: Oct. 21, 1986

[30] Foreign Application Priority Data

Oct. 21, 1985 [DK] Denmark .............................. 4822/85

[51] Int. Cl.⁴ ........................... B32B 3/26; B32B 7/12; B32B 15/04
[52] U.S. Cl. ............................... 428/314.4; 156/307.3; 156/310; 156/311; 428/317.7; 428/319.1
[58] Field of Search ..................... 156/307.3, 310, 311; 428/314.4, 314.8, 317.1, 317.7, 319.1

[56] References Cited

U.S. PATENT DOCUMENTS

| | | | |
|---|---|---|---|
| 3,535,198 | 10/1970 | Bloom | 428/317.7 |
| 4,397,906 | 8/1983 | Nakagawa et al. | 428/317.7 |
| 4,468,431 | 8/1984 | Okey | 428/317.7 |

FOREIGN PATENT DOCUMENTS

| | | | |
|---|---|---|---|
| 129774 | 11/1974 | Denmark . | |
| 2010358 | 11/1970 | Fed. Rep. of Germany | 428/319.1 |
| 2554914 | 6/1977 | Fed. Rep. of Germany | 428/319.1 |
| 43-12665 | 5/1968 | Japan | 428/319.1 |
| 1478692 | 7/1977 | United Kingdom | 428/319.1 |
| 1578074 | 10/1980 | United Kingdom | 428/319.1 |

*Primary Examiner*—William J. Van Balen
*Attorney, Agent, or Firm*—Klarquist, Sparkman, Campbell, Leigh & Whinston

[57] ABSTRACT

A three-layer laminated panel comprising a plane polyurethane foam sheet having outer facing sheets of metal bonded thereto with adhesive, as well as a method for the production of such a panel are disclosed.

13 Claims, 2 Drawing Figures

THREE-LAYER LAMINATED PANEL AND METHOD FOR PRODUCTION

The invention relates to a three-layer laminated panel comprising a plane polyurethane foam sheet of mainly closed cell structure and having facing sheets of metal bonded thereto with a polychloroprene rubber-based contact adhesive as well as a method for the production thereof.

Multilayer laminated panels comprising a core plate of foam, to both sides of which sheets or boards, such as chipboards, plasterboards, plywood sheets or asbestos cement boards, are bonded with adhesive, to both sides of which sheets or boards glass or porcelain enamelled metal sheets in turn are adhesive-bonded as facing sheets or layers, are known and extensively used within the building and industrial sector. The glass enamelled metal sheets are enamelled on both sides. These known multilayer laminated panels are produced thereby that on both sides of the foam core a sheet or board, e.g. a chipboard, a plasterboard, a plywood sheet or an asbestos cement board, is bonded with adhesive, whereupon, in turn, on both sides of the laminated panel thus produced a glass enamelled metal sheet, preferably a glass enamelled steel plate, is bonded with adhesive.

Several attempts have been made to bond glass or porcelain enamelled steel plates with adhesive direct to each side of a foam sheet, as this would simplify and reduce the price of the production of multilayer panels. However, the results obtained have been unsatisfactory, as the panels thus produced were not straight, the glass enamelled metal sheet was more or less loosened, the panels delaminated when subjected to impact, and the cell walls broke down when the glass enamelled metal sheet expanded or shrunk when subjected to heat and cold, respectively.

It is known from U.S. Patent Specification No. 3,535,198 that polyurethane foam sheets having facing layers bonded thereto with a polychloroprene rubber-based (neoprene) contact adhesive and being mounted on the exterior of a building delaminate as a result of the action of the temperature, cfr. column 1, line 71 to column 2, line 4.

DETAILED DESCRIPTION

Figure 1:
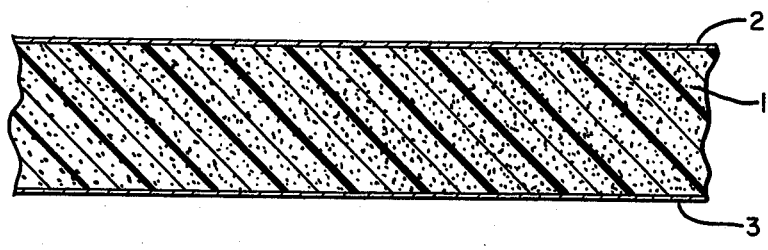
FIG. 1 is a sectional view of a laminated panel according to the present invention.
Figure 2:
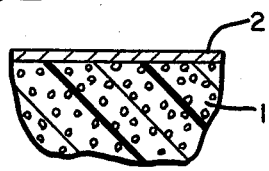
FIG. 2 is an enlarged sectional view of a portion of the panel shown in FIG. 1.

It has surprisingly been found that when using a mainly closed-cell structured polyurethane foam of a density of at least 40 kg/m$^3$ and a polychloroprene rubber-based contact adhesive as the adhesive, three-layer laminated panels having facing sheets or layers of glass enamelled metal can be produced in a simple way. These three-layer laminated panels are weatherproof and dimension stable, even when exposed to the weather for a long time.

Accordingly, the three-layer laminated panel of the invention is characterized by the polyurethane foam sheet having a density of at least 40 kg/m$^3$, and by at least one of the facing sheets or layers being a metal sheet which is glass enamelled on both sides.

As mentioned above, either one of or both of the metal sheets may be glass enamelled. It is preferred to use glass or porcelain enamelled steel plates. When one of the metal sheets is not glass enamelled, it is e.g. made of galvanized steel, copper or aluminum.

In a preferred embodiment of the three-layer laminated panel of the invention the polyurethane foam has a density of 50–120 kg/m$^3$. When the three-layer laminated panel of the invention is used as e.g. facade cladding the polyurethane foam may contain fire retardants, if desired.

The method of the invention is characterized by applying a polychloroprene rubber-based contact adhesive to two opposite sides of a polyurethane foam sheet of a density of at least 40 kg/m$^3$ and of mainly closed cell structure, drying the contact adhesive, if necessary, at a temperature above room temperature, placing the two metal sheets both being coated on one side with polychloroprene rubber-based contact adhesive and subsequently dried, if necessary at a temperature above room temperature, and at least one of said two metal sheets being glass enamelled on both sides, on each side of the polyurethane foam sheet coated with contact adhesive with the contact adhesive layers facing the contact adhesive layers of the polyurethane foam sheet to form a three-layer laminated panel, then placing said panel in a suitable press under a pressure of at least 5 kg/cm$^2$, and thereafter, if necessary, cooling the three-layer laminated panel under pressure.

A particularly preferred embodiment of the method of the invention consists in applying the polychloroprene rubber-based contact adhesive in an amount of about 160 g/m$^2$ on one side of the polyurethane foam sheet (1) having a density of 50–120 kg/m$^3$, drying the contact adhesive at a temperature of about 60° C., treating the opposite side of the polyurethane foam sheet (1) in the same way, and cooling the polyurethane foam sheet to about 20°–25° C., thereafter placing two glass enamelled metal sheets (2,3), coated on one side with polychloroprene rubber-based contact adhesive in an amount of 120 g/m$^2$, dried at a temperature of about 90° C. and cooled to about 30°–40° C., on each side of the contact adhesive coated polyurethane foam sheet with the contact adhesive layers facing the contact adhesive layers of the polyurethane foam sheet to form a three-layer laminated panel, then placing said panel in a press under a pressure of 6 kg/cm$^2$, and thereafter cooling the three-layer laminated panel under pressure for about 24 hours.

For the pressing of the three-layer laminated panel under a pressure of at least 5 kg/cm$^2$ any suitable press can be used. A rolling press with rubber rollers of a suitable hardness can e.g. be used. However, it is also possible to make the pressing in a permanent press.

The solids contents of the polychloroprene rubber-based contact adhesive may vary. Usually a contact adhesive based on "NEOPREN" of a solids contents of about 21 per cent is used.

By varying the density of the used polyurethane foam within the limits stated above and by varying the thickness of the polyurethane foam core three-layer laminated panels of different properties and thicknesses can be prepared. Typically, the glass enamelled steel plate has a thickness of 0.5 mm, but the thickness may vary within wide limits. The length and the width of the three-layer laminated panel of the invention may also be varied with a view to the specifically intended use. For the preparation of large sheets it is suitable to use polyurethane foam of a high density.

The invention is further illustrated in the following with reference to the drawing, which shows a section through a three-layer laminated panel of the invention, which panel comprises a mainly closed-cell structured polyurethane foam core 1 a metal sheet 2, which is glass enamelled on both sides, and a metal sheet 3, which may be glass enamelled.

The invention is further illustrated by means of the following Examples.

EXAMPLE 1

Production of a three-layer laminated insulating panel.

A plane closed-cell structured polyurethane foam sheet ($33 \times 1100 \times 2350$ mm) of a density of 100 kg/m$^3$ was coated on one side with a "NEOPREN"-based contact adhesive of a solids contents of 21 percent in an amount of 160 g/m$^2$. The polyurethane foam panel was then passed through a heating tunnel of a temperature of 60° C. to dry the contact adhesive. Thereafter the polyurethane foam sheet was turned over on the opposite side, whereafter "NEOPREN"-based contact adhesive was applied to this side and dried in exactly the same manner. The polyurethane foam sheet was cooled to 22° C.

Two glass enamelled steel plates ($0.5 \times 1100 \times 2350$ mm) were coated with "NEOPREN"-based contact adhesive in an amount of 120 g/m$^2$. The panels were passed through a heating tunnel at a temperature of about 90° C. to dry the contact adhesive. Thereafter the glass enamelled steel plates were cooled to a temperature of 33° C.

One of the glass enamelled steel plates was placed on a fixing table with the contact adhesive surface facing upwards. The polyurethane foam panel was placed on the glass enamelled steel plate, whereupon the other glass enamelled steel plate was placed on the polyurethane foam panel with the contact adhesive surface facing downwards. The laminate was pressed in a rolling press at a pressure of 6 kg/cm$^2$. The rolling press was equipped with rubber rollers of a shore hardness of 64.

The three-layer laminated panel thus produced was cooled under pressure for 24 hours.

Three-layer laminated panels produced as described above were mounted outdoors with a view to determining the influence of the weather. The test took $2\frac{1}{2}$ year, i.e. three summers and two winters. The panels were mounted towards all corners of the world in order to obtain the optimum cold/heat action. Three-layer laminated panels mounted facing south were produced with a black surface in order to obtain the optimum heat action. After the test period of $2\frac{1}{2}$ year no changes in the panels were observed.

EXAMPLE 2

Production of a three-layer laminated insulating panel with a galvanized steel plate as the back layer.

The method of Example 1 was followed, however using an galvanized steel plate instead of one of the two glass enamelled steel plates.

The three-layer laminated panel thus produced was plane and dimension stable as well as weatherproof.

EXAMPLE 3

Production of a three-layer laminated insulating panel.

A plane closed-cell structured polyurethane foam sheet ($33 \times 1200 \times 1200$ mm) of a density of 40 kg/m$^3$ was coated on one side with a "NEOPREN"-based contact adhesive of a solids contents of 21 percent in an amount of 160 g/m$^2$. The polyurethane foam panel was then passed through a heating tunnel of a temperature of 60° C. to dry the contact adhesive. Thereafter the polyurethane foam sheet was turned over on the opposite side, whereafter "NEOPREN"-based contact adhesive was applied to this side and dried in exactly the same manner. The polyurethane foam sheet was cooled to 22° C.

Two glass enamelled steel plates ($0.5 \times 1200 \times 1200$ mm) were coated with "NEOPREN"-based contact adhesive in an amount of 120 g/m$^2$. The panels were passed through a heating tunnel at a temperature of about 90° C. to dry the contact adhesive. Thereafter the glass enamelled steel plates were cooled to a temperature of 33° C.

One of the glass enamelled steel plates was placed on a fixing table with the contact adhesive surface facing upwards. The polyurethane foam panel was placed on the glass enamelled steel plate, whereupon the other glass enamelled steel plate was placed on the polyurethane foam panel with the contact adhesive surface facing downwards. The laminate was pressed in a rolling press at a pressure of 6 kg/cm$^2$. The rolling press was equipped with rubber rollers of a shore hardness of 64.

The three-layer laminated panel thus produced was cooled under pressure for 24 hours.

Three-layer laminated panels produced as described above were mounted outdoors with a view to determining the influence of the weather. The test took $2\frac{1}{2}$ year, i.e. three summers and two winters. The panels were mounted towards all corners of the world in order to obtain the optimum cold/heat action. Three-layer laminated panels mounted facing south were produced with a black surface in order to obtain the optimum heat action. After the test period of $2\frac{1}{2}$ year no changes in the panels were observed.

COMPARATIVE EXAMPLE 1

Production of a three-layer laminated insulating panel.

A plane closed-cell structured polyurethane foam sheet ($33 \times 1200 \times 1200$ mm) of a density of 30 kg/m$^3$ was coated on one side with a "NEOPREN"-based contact adhesive of a solids contents of 21 percent in an amount of 160 g/m$^2$. The polyurethane foam panel was then passed through a heating tunnel of a temperature of 60° C. to dry the contact adhesive. Thereafter the polyurethane foam sheet was turned over on the opposite side, whereafter "NEOPREN"-based contact adhesive was applied to this side and dried in exactly the same manner. The polyurethane foam sheet was cooled to 40° C.

Two glass enamelled steel plates ($0.5 \times 1200 \times 1200$ mm) were coated with "NEOPREN"-based contact adhesive in an amount of 120 g/m$^2$. The panels were passed through a heating tunnel at a temperature of about 90° C. to dry the contact adhesive. Thereafter the glass enamelled steel plates were cooled to a temperature of 60°–65° C.

One of the glass enamelled steel plates was placed on a fixing table with the contact adhesive surface facing upwards. The polyurethane foam panel was placed on the glass enamelled steel plate, whereupon, after 30 minutes, the other glass enamelled steel plate was placed on the polyurethane foam panel with the contact adhesive surface facing downwards. The laminate was pressed in a rolling press at a pressure of 6 kg/cm². The rolling press was equipped with rubber rollers of a shore hardness of 64.

The three-layer laminated panel thus produced was cooled under pressure for 24 hours.

Some of the panels thus produced delaminate and others are not plane. Intact, plane three-layer laminated panels produced as described above were mounted outdoors in a test setup with a view to determining the influence of the weather. The test took 1 year. It was found that the panels buckle and delaminate.

COMPARATIVE EXAMPLE 2

Production of a three-layer laminated insulating panel.

The procedure of Comparison Example 1 was followed, however using a galvanized steel plate instead of one of the two glass enamelled steel plates.

Some of the panels produced delaminate, and others are not plane. Intact, plane three-layers laminated panels produced as described above were mounted outdoors in a test setup with a view to determining the influence of the weather. The test took 1 year. It was found that the panels buckle and delaminate.

I claim:

1. A three-layer laminated panel comprising:
   a closed cell polyurethane foam sheet having a density of at least 40 kg/m³; and
   outer facing sheets of metal bonded thereto with a polychloroprene rubber-based contact adhesive, at least one of the facing sheets being a metal sheet which is glass enamelled on both sides.

2. A panel according to claim 1, characterized by the glass enamelled metal sheet being a glass enamelled steel plate.

3. A panel according to claim 1, characterized by both facing sheets being glass enamelled steel plates.

4. A panel according to claim 1, 2 or 3, characterized by the polyurethane foam having a density of 50–120 kg/m³.

5. A panel according to claim 4, characterized by the polyurethane foam containing fire-retardants.

6. A panel according to claim 1, 2 or 3, characterized by the polyurethane foam containing fire-retardants.

7. A panel according to claim 1, 2 or 3, characterized by the facing sheets being of a thickness of 0.4–1.0 mm.

8. A method for the production of a three-layer laminated panel, the method comprising:
   applying a polychloroprene rubber-based contact adhesive to two opposite sides of a closed-cell polyurethane foam sheet of a density of at least 40 kg/m³;
   placing two metal sheets, both being coated on one side with polychloroprene rubber-based contact adhesive, at least one of said two metal sheets being glass enamelled on both sides, on each side of the contact adhesive coated polyurethane foam sheet with the contact adhesive layers facing the contact adhesive layers of the polyurethane foam sheet to form a three-layer laminated panel; and
   thereafter compressing the panel under a pressure of at least 5 kg/cm².

9. A method according to claim 8, characterized by the glass enamelled metal sheet being a glass enamelled steel plate.

10. A method according to claim 8, characterized by the metal sheets being glass enamelled steel plates.

11. A method according to claim 8, characterized by drying the adhesive on the foam sheet and the metal sheets at a temperature above room temperature prior to the placing of the metal sheets on the foam sheet.

12. A method according to claim 8, characterized by cooling the three-layered laminated panel while under pressure.

13. A method according to claim 8, characterized by applying the polychloroprene rubber-based contact adhesive in an amount of about 160 g/m² on one side of the polyurethane foam sheet having a density of 50–120 kg/m³, drying the contact adhesive at a temperature of about 60° C., treating the opposite side of the polyurethane foam sheet in the same way, and cooling the polyurethane foam sheet to about 20°–25° C., thereafter placing two glass enamelled metal sheets, coated on one side with polychloroprene rubber-based contact adhesive in an amount of 120 g/m², dried at a temperature of about 90° C. and cooled to about 30°–40° C., on each side of the contact adhesive coated polyurethane foam sheet with the contact adhesive layers facing the contact adhesive layers of the polyurethane foam sheet to form a three-layer laminated panel, then placing said panel in a press under a pressure of 6 kg/cm², and thereafter cooling the three-layer laminated panel under pressure for about 24 hours.

* * * * *